US012567344B2

(12) United States Patent
Tanaka et al.

(10) Patent No.: US 12,567,344 B2
(45) Date of Patent: Mar. 3, 2026

(54) MAP INFORMATION UPDATE METHOD

(71) Applicant: Socionext Inc., Kanagawa (JP)

(72) Inventors: Tetsuya Tanaka, Yokohama (JP);
Yukihiro Sasagawa, Yokohama (JP)

(73) Assignee: SOCIONEXT INC., Kanagawa (JP)

( * ) Notice: Subject to any disclaimer, the term of this
patent is extended or adjusted under 35
U.S.C. 154(b) by 207 days.

(21) Appl. No.: 18/341,466

(22) Filed: Jun. 26, 2023

(65) Prior Publication Data
US 2023/0335016 A1 Oct. 19, 2023

Related U.S. Application Data

(63) Continuation of application No.
PCT/JP2022/008794, filed on Mar. 2, 2022.
(Continued)

(51) Int. Cl.
*G09B 29/10* (2006.01)
*G06T 7/70* (2017.01)

(52) U.S. Cl.
CPC .............. *G09B 29/106* (2013.01); *G06T 7/70*
(2017.01)

(58) Field of Classification Search
CPC ........ G09B 29/106; G09B 29/00; G06T 7/70;
G06T 7/579
See application file for complete search history.

(56) References Cited

U.S. PATENT DOCUMENTS

| 2015/0172626 A1* | 6/2015 | Martini ................... G06T 7/246 |
| | | 348/50 |
| 2017/0019653 A1 | 1/2017 | Chen |

(Continued)

FOREIGN PATENT DOCUMENTS

| JP | 2017-503290 A | 1/2017 |
| JP | 2020-516853 A | 6/2020 |

(Continued)

OTHER PUBLICATIONS

International Search Report (ISR) issued on May 24, 2022 in
International (PCT) Application No. PCT/JP2022/008794, with
English translation.

(Continued)

*Primary Examiner* — Keith D Bloomquist
(74) *Attorney, Agent, or Firm* — Rimon P.C.

(57) ABSTRACT

A map information update method includes: obtaining one
or more projection relationships; obtaining, for each projec-
tion relationship, reprojection error information; calculating,
for each of one or more landmarks, a first sum value based
on all items of reprojection error information associated with
the landmark; calculating, for each of one or more key-
frames, a second sum value based on all items of reprojec-
tion error information associated with the keyframe; infer-
ring from the first sum value, for each landmark, a position
information update value of an item of position information
about the landmark, and updating the item of position
information about the landmark using the position informa-
tion update value; and inferring from the second sum value,
for each keyframe, a pose information update value of an
item of pose information about the keyframe, and updating
the item of pose information about the keyframe using the
pose information update value.

8 Claims, 7 Drawing Sheets

Related U.S. Application Data

(60) Provisional application No. 63/156,795, filed on Mar. 4, 2021.

(56) References Cited

U.S. PATENT DOCUMENTS

| | | | | |
|---|---|---|---|---|
| 2019/0268599 | A1* | 8/2019 | Hannuksela | ........... G03B 37/00 |
| 2019/0318179 | A1 | 10/2019 | Jiang et al. | |
| 2020/0098135 | A1 | 3/2020 | Gangineh et al. | |
| 2020/0143603 | A1* | 5/2020 | Kotake | ................ G01B 11/002 |
| 2020/0334842 | A1* | 10/2020 | Michielin | ................ G06T 15/10 |
| 2021/0375054 | A1* | 12/2021 | Pan | ........................... G06T 7/75 |
| 2023/0046001 | A1 | 2/2023 | Tanaka et al. | |

FOREIGN PATENT DOCUMENTS

| | | | |
|---|---|---|---|
| WO | 2018/104563 | A1 | 6/2018 |
| WO | 2018/131165 | A1 | 7/2018 |
| WO | 2021/235458 | A1 | 11/2021 |

OTHER PUBLICATIONS

Yuuki Iwamoto, Yasuyuki Sugaya, and Kenichi Kanatani, "Bundle Adjustment for 3-D Reconstruction: Implementation and Evaluation," IPSJ SIG Technical Report, Information Processing Society of Japan, 2011-CVIM-175-19, pp. 1-8, 2011 with its partial translation.

Takayuki Okatani, "Bundle Adjustment," IPSJ SIG Technical Report, Information Processing Society of Japan, 2009-CVIM-167-37, pp. 1-16, 2009 with its partial translation.

Tomonori Shindoh, "Google innovates with deep learning-based monocular SLAM technology, achieving self-position estimation accuracy that surpasses exsisting vSLAM," Nikkei Robotics, Jun. 10, 2019, No. 48, pp. 5-13, ISSN 2189-5783, Cited in the ISR for PCT/JP2022/008794.

Battaglia et. al., Relational inductive biases, deep learning, and graph networks [online], Oct. 17, 2018, retrieved on Apr. 28, 2022, pp. 1-40, Cited in the ISR for PCT/JP2022/008794.

* cited by examiner

1

MAP INFORMATION UPDATE METHOD

CROSS REFERENCE TO RELATED APPLICATIONS

This is a continuation application of PCT International Application No. PCT/JP2022/008794 filed on Mar. 2, 2022, designating the United States of America, which is based on and claims priority of U.S. Provisional Patent Application No. 63/156,795 filed on Mar. 4, 2021. The entire disclosures of the above-identified applications, including the specifications, drawings and claims are incorporated herein by reference in their entirety.

FIELD

The present disclosure relates to a map information update method.

BACKGROUND

Visual simultaneous localization and mapping (VSLAM) technology has been conventionally known. The technology is for capturing images using a camera and simultaneously estimating the position of the camera and the position of each of landmarks based on information included in key-frames which are the captured images.

Main processing in the VSLAM technology includes: calculating (i) the positions of each landmark in respective keyframes and (ii) a reprojection error which is an error between assumed pose information (that is camera position and orientation) of each keyframe and a reprojection position which is the position in the keyframe calculated based on the assumed position of the landmark; and calculating pose information regarding the keyframe and the position of the landmark that make the reprojection error to be 0 (actually, that make the error to be sufficiently small). Information in which the pose information regarding the keyframe and the position of the landmark are combined is referred to as map information.

Searching out map information that makes a reprojection error to be 0 is referred to as bundle adjustment. Bundle adjustment is processing that is generally classified into the nonlinear least squares optimization problem. For this reason, the bundle adjustment requires processing of slightly correcting map information such that a current reprojection error is decreased, and repeating such correction until the value of a decreased reprojection error converges (for example, see Patent Literature 1, Non-patent Literature 1, and Non-patent Literature 2).

CITATION LIST

Patent Literature

PTL 1: Japanese Unexamined Patent Application Publication) No. 2017-503290

Non Patent Literature

NPL 1: Yuuki Iwamoto, Yasuyuki Sugaya, Kenichi Kanatani, Bundle Adjustment for 3-D Reconstruction: Implementation and Evaluation, Search Report, 2011-CVIM-175-19, pp. 1-8, 2011, Information Processing Society of Japan,

2

NPL 2: Takayuki Okatani, Bundle Adjustment, Search Report, 2009-CVIM167-37, pp. 1-16, 2009, Information Processing Society of Japan

SUMMARY

Technical Problem

In the VSLAM technology, a new reprojection error is calculated each time when a new keyframe is added, and map information is updated through bundle adjustment. Such processing is essential to maintain the accuracy of map information.

Algorithms using the gradient method are generally used as algorithms for conversion that is required for bundle adjustment. For example, an algorithm in which the steepest descent method and the Gauss-Newton method are combined has been known as an algorithm using the gradient method. In the algorithm, correction is performed using the steepest descent method until a reprojection error becomes close to the minimum value, and correction is performed using the Gauss-Newton method after the reprojection error becomes close to the minimum value. In such an algorithm, processing that requires a large amount of computation needs to be executed. Such processing includes generating a Hessian matrix and calculating the amount of correction by solving a system of equations. The presence of such processing that requires a large amount of computation is a problem when the VSLAM technology is used.

The present disclosure has been made to solve such a problem, and has an object to provide a map information update method for enabling reduction in the amount of computation.

Solution to Problem

In order to achieve the above object, a map information update method according to an aspect of the present disclosure is a map information update method for updating map information including one or more items of position information each associated with a corresponding one or more landmarks and one or more items of pose information each associated with a corresponding one of one or more keyframes, wherein each of the one or more keyframes is a captured image in which an image of at least one of the one or more landmarks is included, each of the one or more items of pose information includes information about a position and information about an orientation, and the map information update method comprises: obtaining one or more projection relationships each of which is a relationship of (i) a corresponding one of the one or more landmarks, (ii) a corresponding one of the one or more keyframes, and (iii) projection coordinate information corresponding to coordinates of a projection point on the corresponding one of the one or more keyframes at a time when the corresponding one of the one or more landmarks is projected onto the corresponding one of the one or more keyframes; obtaining, for each of the one or more projection relationships, reprojection error information based on (i) an item of position information which is associated with the corresponding one of the one or more landmarks included in the projection relationship among the one or more items of position information, (ii) an item of pose information which is associated with the corresponding one of the one or more keyframes included in the projection relationship among the one or more items of pose information, and (iii) the projection coordinate information included in the projection relationship, and associating the reprojection error information with the projection relationship; generating, for each of the one or more landmarks, a first reprojection error information aggregate in which all items of reprojection error information associated with the landmark are aggregated, and calculating a first sum value based on the all items of reprojection error information included in the first reprojection error information aggregate; generating, for each of the one or more keyframes, a second reprojection error information aggregate in which all items of reprojection error information associated with the keyframe are aggregated, and calculating a second sum value based on the all items of reprojection error information included in the second reprojection error information aggregate; inferring from the first sum value, for each of the one or more landmarks, a position information update value which is an update value of an item of position information about the landmark among the one or more items of position information, and updating the item of position information about the landmark using the position information update value; and inferring from the second sum value, for each of the one or more keyframes, a pose information update value which is an update value of an item of pose information about the keyframe among the one or more items of pose information, and updating the item of pose information about the keyframe using the pose information update value.

Advantageous Effects

With the present disclosure, the map information update method which enables reduction in the amount of computation can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
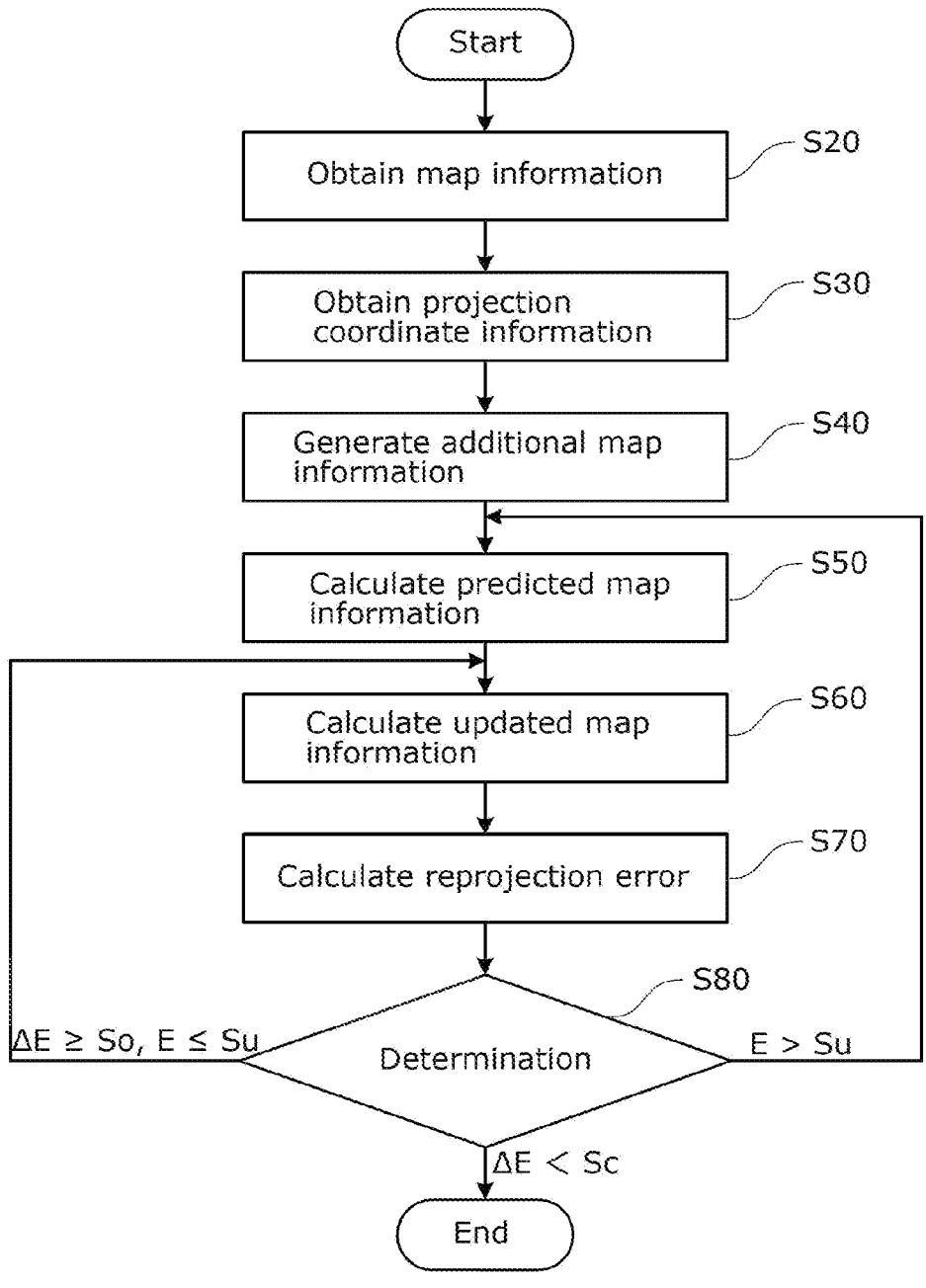
FIG. 1 is a flowchart indicating a flow of a map information update method according to Embodiment 1.

Hereinafter, embodiments of the present disclosure are described in detail with reference to the drawings. It is to be noted that each of the embodiments to be described below indicates one specific example of the present disclosure. The numerical values, shapes, materials, standards, elements, the arrangement and connection of the elements, steps, the order of the steps etc., indicated in the following embodiments are mere examples, and therefore do not limit the scope of the present disclosure. In addition, among the elements in the following embodiments, elements not recited in any one of the independent claims each of which defines the most generic concept are described as optional elements. In addition, each of the drawings is not always illustrated or indicated precisely. Throughout the drawings, substantially the same elements are assigned with the same numerical signs, and overlapping descriptions may be omitted or simplified.

Embodiment 1

A map information update method according to Embodiment 1 is described.

[1.1 Outline of Map Information Update Method]

First, an outline of map information update method is described. The map information update method is a method that is used in the VSLAM technology for capturing images using a camera and simultaneously estimating the position of a camera and the position of each of landmarks based on information included in keyframes which are the captured images. The map information update method according to the present embodiment involves updating map information that includes one or more items of position information each associated with a corresponding one of one or more landmarks and one or more items of pose information each associated with a corresponding one of one or more keyframes. Each of the one or more keyframes is a captured image in which an image of at least one of the one or more landmarks is included. Each of the one or more items of pose information includes information about a position and information about an orientation regarding a camera that is to be used for imaging.

In the VSLAM technology, first, a single three-dimensional coordinate system is assumed as a first coordinate system, and a camera is disposed in the first coordinate system. The first coordinate system is a coordinate system that is fixed for a space in which the camera, etc., are disposed, and is also referred to as a world coordinate system. One or more landmarks are generated from one or more keyframes captured by the camera. Here, a landmark is a three-dimensional point generated in the first coordinate system. For example, a landmark is generated through triangulation, based on corresponding feature points included in each of two keyframes. In the map information update method according to the present embodiment, map information including estimated positions of the camera and each of the one or more landmarks in the first coordinate system is updated. Specifically, when information about a keyframe captured by the camera is added to map information, and/or when bundle adjustment has been performed, the map information according to the present embodiment is updated.

Hereinafter, the map information update method according to the present embodiment is described with reference to FIG. 1. FIG. 1 is a flowchart indicating a flow of a map information update method according to the present embodiment.

As indicated in FIG. 1, in the map information update method according to the present embodiment, map information is firstly obtained (S20). The map information at least includes one or more items of position information about one or more landmarks and one or more items of pose information about one or more keyframes.

Next, one or more items of projection coordinate information are obtained (S30). The one or more items of projection coordinate information indicate the position(s) of one or more landmarks in a second coordinate system in each of keyframes captured by a camera. The second coordinate system is a coordinate system that is fixed for a captured image, and is also referred to as a keyframe coordinate system. The projection coordinate information is the position in the second coordinate system of each of one or more feature points which correspond respectively to the one or more landmarks. In other words, the projection coordinate information is information corresponding to the keyframe coordinates of the projection point(s) at the time when the one or more landmarks are respectively projected on the one or more keyframes.

Next, additional map information is generated by adding the projection coordinate information to the map information obtained in Step S20 (S40). Information regarding the projection coordinate information may be added to the additional map information. For example, the information regarding the projection coordinate information is an estimated position, etc., of a landmark generated based on feature points included in a keyframe. The information regarding the projection coordinate information may be information that has been roughly calculated based on the position, etc., of a camera.

After Step S40, predicted map information is calculated based on the additional map information generated in Step S40, and the map information updated in Step S40 is updated to the predicted map information (S50). Here, a method for calculating predicted map information is described. Generally, bundle adjustment is performed when updating map information. In other words, map information that makes a reprojection error to be 0 is searched out. In the present embodiment, a reprojection error is information that has been obtained based on position information, pose information, and projection coordinate information. More specifically, a reprojection error is calculated using a reprojection error function for calculating an error between projection coordinate information and reprojection position. The reprojection position is on a captured image corresponding to the projection coordinate information in the projection coordinates and is calculated based on the map information. It is to be noted that a reprojection error may include one of or both (i) an error which has been calculated, using a reprojection error function, for each of one or more landmarks included in map information, and (ii) an error which has been calculated, using a reprojection function, for each of one or more keyframes.

Figure 2:
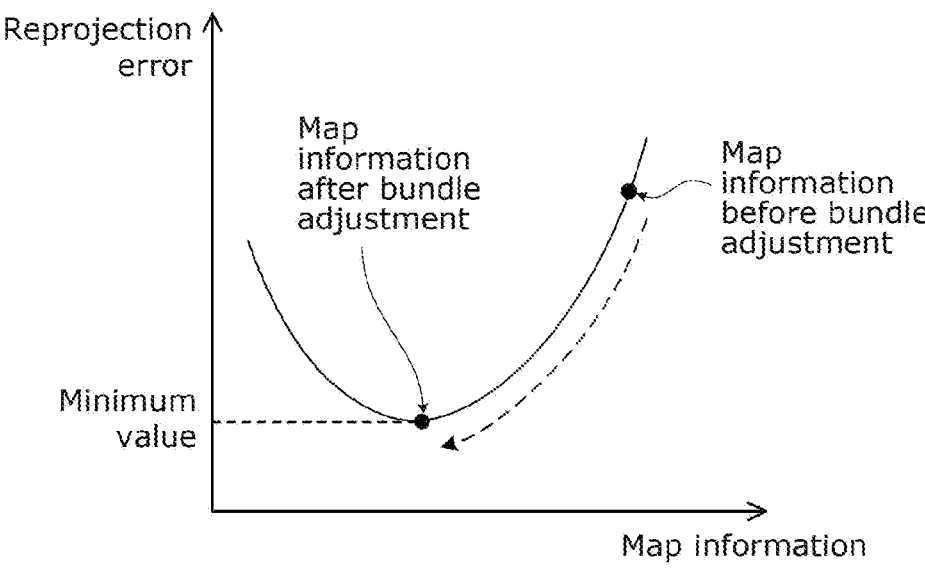
FIG. 2 is a schematic graph illustrating relationships between map information and reprojection errors in bundle adjustment.

Here, an outline of bundle adjustment is described with reference to FIG. 2. FIG. 2 is a schematic graph illustrating relationships between map information and reprojection errors in the bundle adjustment. In FIG. 2, the horizontal axis indicates amounts each schematically representing an item of map information as a variable, and the vertical axis indicates reprojection errors with respect to items of map information.

As indicated in FIG. 2, the map information before the bundle adjustment is corrected to map information that minimizes a reprojection error through the bundle adjustment. For example, when bundle adjustment is performed according to an algorithm using a gradient method such as an algorithm in which the steepest descent method and the Gauss-Newton method are combined, correction is performed using a slight amount of correction for the map information before the bundle adjustment, and a reprojection error after the correction is iteratively calculated so as to search out the map information that minimizes the reprojection error. It is to be noted that the map information that minimizes the reprojection error is also referred to as a solution of the map information. Here, the solid geometrical algorithm using the gradient method involves processing that requires, for each iteration of such correction, a large amount of computation for generating a Hessian matrix and for calculating the amount of correction obtained by solving the system of equations using the nonlinear least squares optimization problem. In particular, when an error between the map information before the bundle adjustment and the solution of the map information is large, a large number of iterative computations need to be performed.

Figure 3:
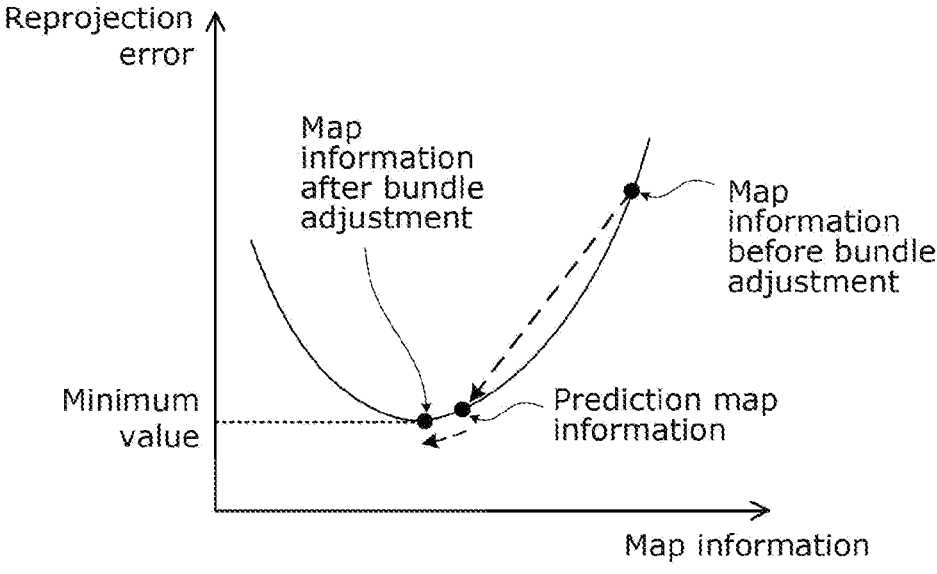
FIG. 3 is a schematic graph for explaining an outline of predicted map information according to Embodiment 1.

In connection with such conventional technology, in the present embodiment, the amount of computation is reduced by using inference engines for at least part of computation for calculating predicted map information. The outline of the method for calculating the predicted map information according to the present embodiment is described with reference to FIG. 3. FIG. 3 is a schematic graph for explaining the outline of predicted map information according to the present embodiment.

As illustrated in FIG. 3, in the present embodiment, map information that makes a reprojection error close to a minimum value is calculated as predicted map information using inference engines based on the map information. In this way, it is possible to obtain the map information that makes the reprojection error close to the minimum value without repeating computations by the algorithm using the gradient method. A neural network for prediction included in each of the inference engines is a neural network that has received map information for training as an input, and has learned updated map information for training as training data. The learning is performed by considering a loss function based on the difference between updated map information for training and map information as an output by the neural network, and then the learning is proceeded so as to make the loss function to be 0. The map information for training is not particularly limited as long as the map information for training is similar to additional map information that is used in the map information update method according to the present embodiment.

The updated map information for training is map information that has been generated based on map information for training and that decreases the reprojection error calculated using the reprojection error function. For this reason, the loss function in the training may be regarded as being based on the reprojection error function. Since the reprojection error function is directly calculated from map information (for training), updated map information for training as training data is unnecessary in the training in this case. Here, the reprojection error function is a function for calculating the error between the projection coordinate information and the reprojection position that is on a captured image corresponding to the projection coordinate information and is calculated based on map information. Specifically, a known function that is for example disclosed in Non-patent Literature 1 may be used as such a reprojection error function.

The updated map information for training is obtained by, for example, actually performing bundle adjustment using the gradient method for the projection coordinate information for training and map information for training. It is to be noted that the map information that decreases the reprojection error may be, for example, map information that minimizes the reprojection error. The map information that minimizes the reprojection error is not limited to map information that precisely minimizes the reprojection error, and includes map information that roughly minimizes the reprojection error. For example, map information that makes the error between the reprojection error of map information and the minimum value for the reprojection error to be 5% or less of the minimum value is included in the map information that minimizes the reprojection error.

The neural network for prediction according to the present embodiment learns the shape of an error function indicating the relationship between the map information and the reprojection error by performing the learning described above. The learning by the neural network for prediction is processing corresponding to fitting to the error function. The neural network for prediction becomes capable of predicting the map information that minimizes the reprojection error by learning the shape of the error function. It is to be noted that information about camera position, etc., included in the map information changes according to current map information, but the error function learned by the neural network for prediction does not change. In addition, the predicted map information does not always need to be the map information that minimizes the reprojection error.

It is to be noted that, the map information update method according to the present embodiment may be added with a step for suppressing the predicted map information calculated using one or more inference engines from being away from the solution of the map information (that is, suppressing the difference between the predicted map information and the map information from being larger than the difference between additional map information and the solution of the map information). For example, an inference engine for predicting the correction direction for making additional map information closer to map information is prepared in advance, and whether the predicted map information becomes closer to the solution of the map information than the additional map information does may be determined.

In the present embodiment, it is possible to replace at least part of computations for, for example, obtaining the solution of the system of equations in the gradient method in the conventional art with inference using the inference engine. For this reason, in the present embodiment, it is possible to reduce the amount of computation and increases the computation parallelism. Accordingly, in the present embodiment, advantageous effects of high-speed map information update and reduced power consumption are obtained. In the inference using the inference engine may further reduce a required computation accuracy. For this reason, it also becomes possible to simplify the hardware structure of the computer, etc., for executing the map information update method. It is to be noted that details of the method for calculating predicted map information using inference engines are described later.

Next, as indicated in FIG. 1, updated map information is calculated solid geometrically for the map information updated in Step S50, and the map information updated in Step S50 is updated to updated map information (S60). In other words, as in the conventional art, for example, the map information is updated by using the algorithm in which the steepest descent method and the Gauss-Newton method are combined, so as to make the map information closer to the solution.

Next, a reprojection error for the map information is calculated (S70). More specifically, the reprojection error for the map information is calculated using the reprojection error function described above.

Next, a determination is made as to whether update of the map information updated in Step S60 based on the reprojection errors calculated using the reprojection error function for the map information updated in Step S60 has converged, and based on the result of the determination, a determination is made as to whether to return to the prediction step or the update step or to end the updating of the map information updated in Step S60 (S80). For example, when the amount of variation $\Delta E$ of a reprojection error from the reprojection error at the time of the previous determination (at the time of a first determination, the amount of variation from a reprojection error for predicted map information) is smaller than predetermined convergence threshold value Sc ($\Delta E < Sc$ in S80), it is determined that the solution of the map information has been calculated, and the updating of the map information is ended. When reprojection error E is larger than upper-limit value Su (E>Su in S80), it is determined that the predicted map information is not appropriate, a return to Step S50 is made, and predicted map information is calculated again. When the amount of variation $\Delta E$ from the time of the previous determination of the reprojection error is larger than or equal to convergence threshold value Sc and reprojection error E is smaller than or equal to upper-limit value Su ($\Delta E \geq Sc$, and $E \geq Su$ in S80), a return to Step S60 is made, and map information is updated again using the gradient method.

The map information update method as described above makes it possible to reduce the amount of computation required for map information updating than in the cases in which the conventional art is used.

[1-2. Method for Calculating Predicted Map Information]

Figure 4:
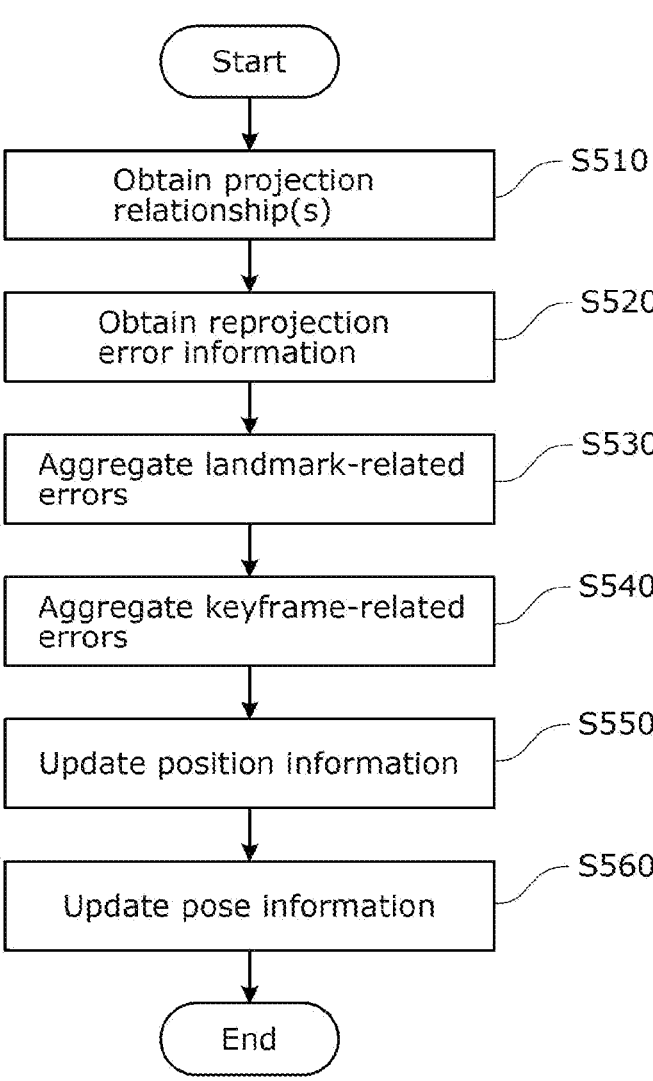
FIG. 4 is a flowchart indicating a method for calculating predicted map information according to Embodiment 1.

A method for calculating predicted map information in the map information update method according to the present embodiment is described with reference to FIG. 4. FIG. 4 is a flowchart indicating the method for calculating predicted map information according to the present embodiment.

Figure 5:
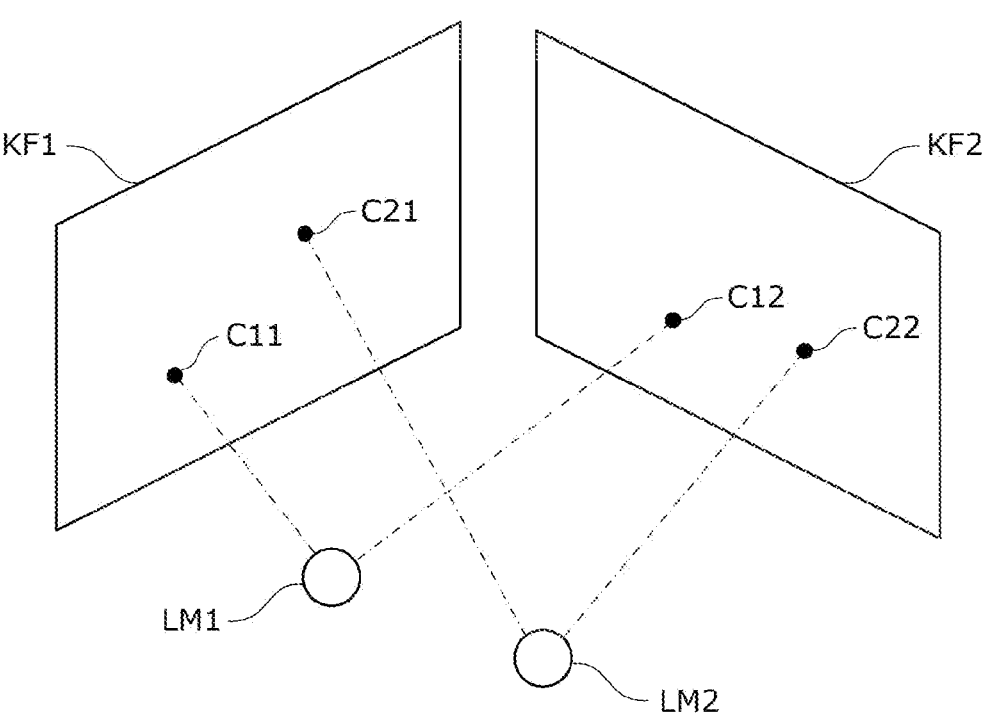
FIG. 5 is a schematic diagram for explaining projection relationships between keyframes and landmarks.

As indicated in FIG. 4, first, one or more projection relationships are obtained (projection relationship obtaining step S510). Here, the one or more projection relationships are described with reference to FIG. 5. FIG. 5 is a schematic diagram for explaining projection relationships between keyframes and landmarks. The projection relationships are each a relationship of a landmark, a keyframe, and projection coordinate information corresponding to coordinates of a projection point on the keyframe at the time when the landmark is projected onto the keyframe. FIG. 5 indicates two landmarks LM1 and LM2 and two keyframe KF1 and KF2. In addition, FIG. 5 indicates: projection coordinate information C11 and projection coordinate information C12 which indicate landmark LM1 projected respectively on keyframes KF1 and KF2; and projection coordinate information C21 and projection coordinate information C22 which indicate landmark LM2 projected respectively on keyframes KF1 and KF2.

In the present step, a projection relationship between each of one or more landmarks and a corresponding one of one or more keyframes is obtained. The example illustrated in FIG. 5 includes: a correspondence relationship of landmark LM1, keyframe KF1, and projection coordinate information C11; a correspondence relationship of landmark LM1, keyframe KF2, and projection coordinate information C12; a correspondence relationship of landmark LM2, keyframe KF1, and projection coordinate information C21; and a correspondence relationship of landmark LM2, keyframe KF2, and projection coordinate information C22. In addition, projection coordinate information indicates actual coordinates of a landmark that is projected on a keyframe, and does not indicate coordinates calculated from map information.

Next, as indicated in FIG. 4, reprojection error information is obtained for each of the one or more projection relationships, and the reprojection error information is associated with the projection relationship (reprojection error information obtaining step (S520). Reprojection error information includes a feature indicating the result of inferring the reprojection error based on (i) one of one or more items of position information, (ii) one of one or more items of pose information, and (iii) projection coordinate information which correspond to one of the one or more projection relationships. Here, the reprojection error is an error that is calculated solid geometrically from the item of position information, the item of pose information, and the item of projection coordinate information. In the present embodiment, the feature indicating the result of inferring the reprojection error is calculated instead of calculating the reprojection error in the present embodiment. The feature included in the reprojection error information includes, for example, a weight vector, an error vector, or the like corresponding to the projection relationship of the corresponding landmark and keyframe. In other words, the feature includes terms included commonly in blocks including the diagonal components in a Hessian matrix that is used to calculate an update value of map information.

Here, the feature is described in detail using the Hessian matrix. An equation for calculating an update value of map information according to the conventional Gauss-Newton method is represented by the following expression (1) using Hessian matrix H and update value $\Delta\xi$ for parameter $\xi$.

[Math. 1]

$$H\Delta\xi = g \tag{1}$$

Here, the matrix in the expression (1) and vector components are represented according to the following expression (2).

[Math. 2]

$$
\begin{bmatrix}
h_1^{LM} & & & & & \\
& \ddots & & & & \\
& & h_N^{LM} & & & \\
& & & h_1^{\omega\omega} & h_1^{\omega t} & \\
& & & h_1^{t\omega} & h_1^{tt} & \\
& & & & & \ddots \\
& & & & & & h_M^{\omega\omega} & h_M^{\omega t} \\
& & & & & & h_M^{t\omega} & h_M^{tt}
\end{bmatrix}
\begin{bmatrix}
\Delta x_1 \\
\vdots \\
\Delta x_N \\
\Delta\omega_1 \\
\Delta t_1 \\
\vdots \\
\Delta\omega_M \\
\Delta t_M
\end{bmatrix}
=
\begin{bmatrix}
g_1^{LM} \\
\vdots \\
g_N^{LM} \\
g_1^{\omega} \\
g_1^{t} \\
\vdots \\
g_M^{\omega} \\
g_M^{t}
\end{bmatrix}
\tag{2}
$$

It is to be noted that components other than the components in the diagonal blocks are not described in the Hessian matrix according to the expression (2).

Here, when a is an integer in the range of 1 to N, inclusive, the blocks related to the landmark in the Hessian matrix and the components related to the blocks among the components of the gradient vectors in the right side are represented by the following expressions (3a) and (3b).

[Math. 3]

$$h_\alpha^{LM} = \Sigma_{j=1}^{M} I_{\alpha j} R_j W_{\alpha j} W_{\alpha j}^{T} R_j^{T} \tag{3a}$$

[Math. 4]

$$g_\alpha^{LM} = 2\Sigma_{j=1}^{M} I_{\alpha j} R_j W_{\alpha j} e_{\alpha j} \tag{3b}$$

In each of the expressions (3a) and (3b), $I_{\alpha j}$ denotes 0 or 1, and indicates visibility of the $\alpha$th landmark when seen from the jth camera having a pose. $R_j$ is a rotation matrix indicating the pose of the jth camera. $W_{\alpha j}$ is a 3×2 matrix that is calculated from the pose of the jth camera. Here, $e_{\alpha j}$ is the difference between the reprojection coordinates and projection coordinate information (the actual coordinates of a projection point).

In addition, the diagonal blocks among the blocks in the Hessian matrix and the components related to the diagonal blocks among the components included in the gradient vectors are represented according to the following expressions (4a) to (5c) where k is an integer in the range of 1 to M, inclusive.

[Math. 5]

$$h_\kappa^{\omega\omega} = \Sigma_{i=1}^{N} I_{i\kappa}(x_i - t_\kappa) \times R_\kappa W_{i\kappa} W_{i\kappa}^{T} R_\kappa^{T}\{(x_i - t_\kappa) \times I\} \tag{4a}$$

[Math. 6]

$$h_\kappa^{\omega t} = \Sigma_{i=1}^{N} I_{i\kappa}(x_i - t_\kappa) \times R_\kappa W_{i\kappa} W_{i\kappa}^{T} R_\kappa^{T} \tag{4b}$$

[Math. 7]

$$g_\kappa^{\omega} = 2\Sigma_{i=1}^{N} I_{i\kappa}(x_i - t_\kappa) \times R_\kappa W_{i\kappa} e_{i\kappa} \tag{4c}$$

[Math. 8]

$$h_\kappa^{t\omega} = \Sigma_{i=1}^{N} I_{i\kappa} R_\kappa W_{i\kappa} W_{i\kappa}^{T} R_\kappa^{T}\{(x_i - t_\kappa) \times I\} \tag{5a}$$

[Math. 9]

$$h_\kappa^{tt} = \Sigma_{i=1}^{N} I_{i\kappa} R_\kappa W_{i\kappa} W_{i\kappa}^{T} R_\kappa^{T} \tag{5b}$$

[Math. 10]

$$g_\kappa^{t} = 2\Sigma_{i=1}^{N} I_{i\kappa} R_\kappa W_{i\kappa} e_{i\kappa} \tag{5c}$$

Here, $X_i$ indicates position information about the ith landmark. Here, $t_k$ is a translation vector of the kth camera pose, and indicates a camera position.

When the Hessian matrix or the like is represented as described above, the feature is calculated based on $u_{\alpha\kappa}$, $R_\kappa W_{\alpha\kappa}$, and $(x_\alpha - t_\kappa)$. Here, $u_{\alpha\kappa}$ denotes reprojection coordinates. Here, $R_\kappa W_{\alpha\kappa}$ denotes a weight coefficient. Here, $(x_\alpha - t_\kappa)$ indicates a relative position between the landmark and the corresponding keyframe. Such a feature is obtained for each correspondence relationship.

Figure 6:
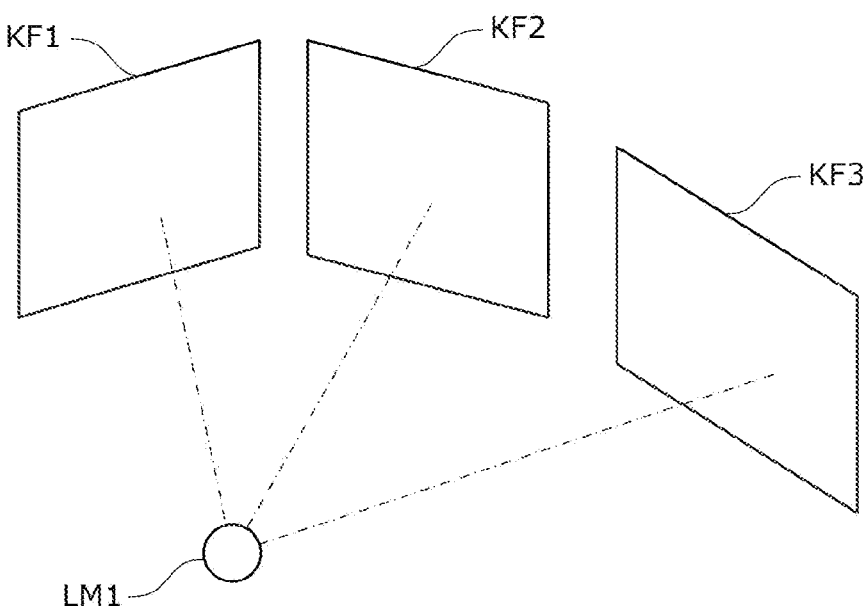
FIG. 6 is a schematic diagram for explaining a first reprojection error information aggregate according to Embodiment 1.

Next, landmark-related errors are aggregated (landmark-related error aggregating step S530). In other words, for each of the one or more landmarks, a first reprojection error information aggregate in which all items of reprojection error information associated with the landmark are aggregated is generated, and a first sum value is calculated based on the all items of reprojection error information included in the first reprojection error information aggregate. Here, the first reprojection error information aggregate is described with reference to FIG. 6. FIG. 6 is a schematic diagram for explaining a first reprojection error information aggregate according to the present embodiment. FIG. 6 indicates an example of a configuration in which landmark LM1 is projected on only three keyframes KF1, KF2, and KF3. A description is given of a case in which landmark LM1 is projected on only three keyframes KF1, KF2, and KF3 as illustrated in FIG. 6. In this case, reprojection error information is calculated from the position information about landmark LM1, the pose information about keyframe KF1, and the projection coordinate information about landmark LM1 onto keyframe KF1. Such calculation of the reprojection error information is also performed for other keyframes KF2 and KF3, and these three reprojection errors are aggregated. Reprojection errors for each of the other landmarks are also aggregated.

Specifically, the feature that is obtained for each correspondence relationship described above is summed for each component. Such errors are aggregated, the components related to the blocks related to the landmark indicated in the above expression (3a) and the blocks related to the gradient vectors indicated in the above expression (3b) are obtained.

Figure 7:
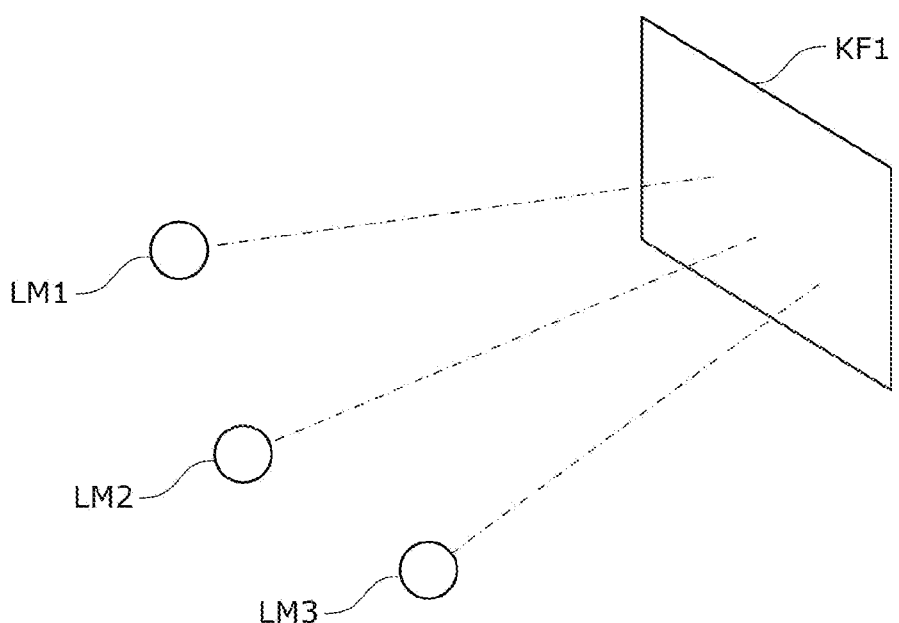
FIG. 7 is a schematic diagram for explaining a second reprojection error information aggregate according to Embodiment 1.

Next, as indicated in FIG. 4, keyframe-related errors are aggregated (keyframe-related aggregating step S540). In other words, for each of the one or more keyframes, a second reprojection error information aggregate in which all items of reprojection error information associated with the keyframe are aggregated is generated, and a second sum value is calculated based on the all items of reprojection error information included in the second reprojection error information aggregate. Here, the second reprojection error information aggregate is described with reference to FIG. 7. FIG. 7 is a schematic diagram for explaining a second reprojection error information aggregate according to the present embodiment. FIG. 7 indicates an example of a configuration in which only three landmarks LM1, LM2, and LM3 are projected on keyframe KF1. A description is given of a case in which only landmarks LM1, LM2, and LM3 are projected on keyframe KF1 as illustrated in FIG. 7. In this case, reprojection error information is calculated from the pose information about keyframe KF1, the position information about landmark LM1, and the projection coordinate information about landmark LM1 onto keyframe KF1. Such calculation of the reprojection error information is also performed for other landmarks LM2 and LM3, and these three reprojection errors are aggregated. Reprojection errors for each of the other keyframes are also aggregated.

Specifically, the feature that is obtained for each correspondence relationship described above is summed for each component. Such errors are aggregated, the components related to the diagonal blocks in the Hessian matrix indicated in the above expressions (4a) to (4c) and (5a) to (5c) and the blocks related to the gradient vectors indicated in the above expression (3b) are obtained.

Next, as indicated in FIG. 4, the position information is updated (position information update step S550). In the step, for each of the one or more landmarks, a position information update value that is an update value of the position information about the landmark is inferred from the first sum value calculated in the landmark-related error aggregating step S530, and updates the position information about the landmark using the position information update value.

Next, pose information is updated (pose information update step S560). In the step, for each of the one or more keyframes, a pose information update value that is an update value which is an update value of an item of pose information about the keyframe from the second sum value calculated in the keyframe-related error aggregating step S540, and updating the item of pose information about the keyframe using the pose information update value.

As described above, it is possible to calculate the position information update value of each of the one or more landmarks and the pose information update value of the one or more keyframes. It is possible to obtain predicted map information based on the position information update value and the pose information update value.

In the present embodiment, as described above, the position information update value and the pose information update value are calculated through inference, and thus it is possible to reduce the amount of computation significantly compared to the amount of computation in the case in which the position information update value and the pose information update value are calculated solid geometrically. Furthermore, in the present embodiment, the degrees of freedom of the solution in the inference can be reduced by separating inference for the position information and inference for the pose information, and thus it becomes possible to perform the inference more precisely.

Moreover, in the present embodiment, the degrees of freedom of the solution for each of inference engines can be reduced by separating inference for the position information, inference for the pose information, and further separating the inference for the pose information based on the orientation and position, and thus it is possible to cause the inference engine to perform learning more reliably. It is to be noted that the learning method for the inference engine is described later.

In addition, in the present embodiment, also the reprojection error information is calculated through inference, the amount of computation can be reduced further.

[1.3 Map Information Update Device]

Figure 8:
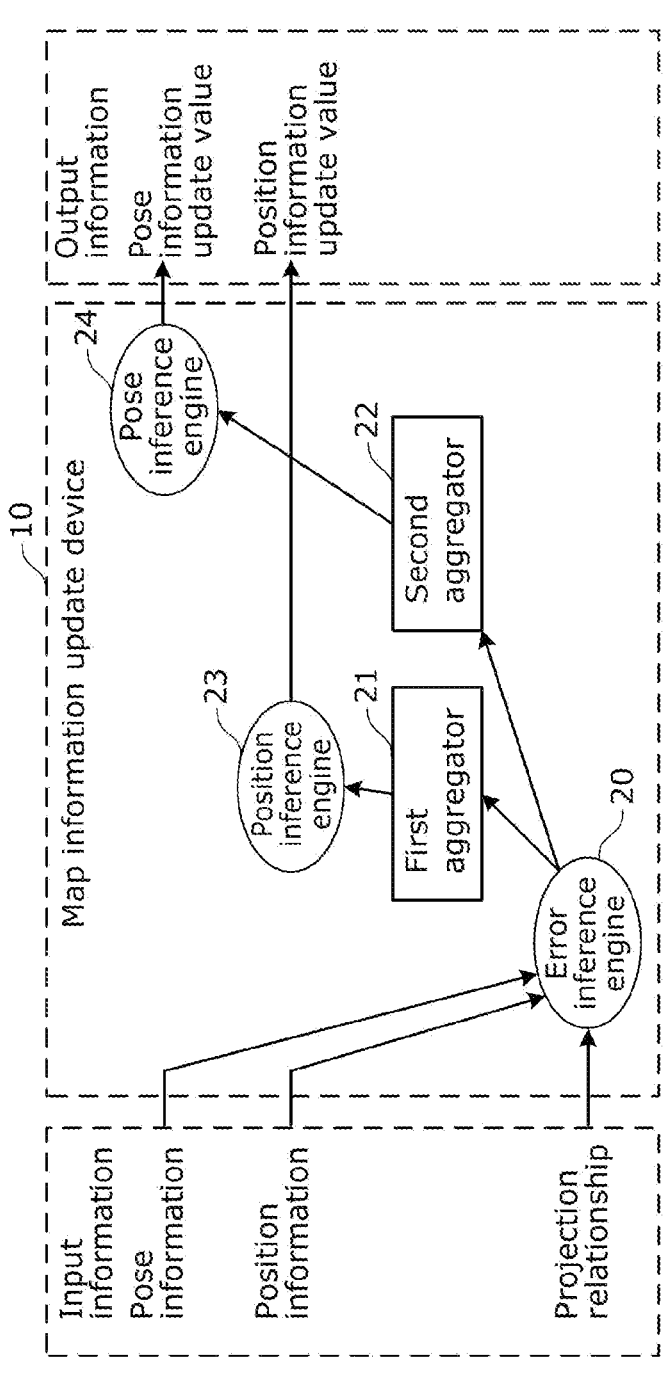
FIG. 8 is a block diagram illustrating a functional configuration of a map information update device according to Embodiment 1.

One example of a map information update device capable of performing the predicted map information calculating method in the map information update method according to the present embodiment is described with reference to FIG. 8. FIG. 8 is a block diagram illustrating a functional configuration of map information update device 10 according to the present embodiment. As illustrated in FIG. 8, map information update device 10 receives input information including position information, pose information, and projection relationships, and outputs output information including an update value for the position information and an update value for the pose information.

As illustrated in FIG. 8, map information update device 10 includes error inference engine 20, first aggregator 21, second aggregator 22, position inference engine 23, and pose inference engine 24.

Error inference engine 20 is an inference engine that executes the reprojection error information obtaining step in the map information update method. Error inference engine 20 obtains, for each of the one or more projection relationships, an item of position information associated with one landmark included in the projection relationship, an item of pose information associated with one keyframe included in the projection relationship, and the projection coordinate information included in the projection relationship, and associates the reprojection error information with the projection relationship.

In the present embodiment, the reprojection error information includes a feature indicating the result of inferring the reprojection error from the item of position information, the item of pose information, and the projection coordinate information which correspond to the one of the one or more projection relationships.

As described above, the reprojection error is an error which is calculated solid geometrically from the item of position information, the item of pose information, and the projection coordinate information.

First aggregator 21 is a processing unit which executes the landmark-related error aggregating step in the map information update method. First aggregator 21 generates, for each of the one or more landmarks, a first reprojection error information aggregate in which all items of reprojection error information associated with the landmark are aggregated is generated, and a first sum value is obtained based on the all items of reprojection error information included in the first reprojection error information aggregate.

Second aggregator 22 is a processing unit which executes the keyframe-related error aggregating step in the map information update method. Second aggregator 22 generates, for each of the one or more keyframes, a second reprojection error information aggregate in which all items of reprojection error information associated with the keyframe are aggregated is generated, and a second sum value is calculated based on the all items of reprojection error information included in the second reprojection error information aggregate.

Position inference engine 23 is an inference engine which executes the position information update step in the map information update method. Position inference engine 23 infers a position information update value which is an update value for the item of position information about the landmark from the first sum value, and updates the item of position information about the landmark using the position information update value.

Pose inference engine 24 is an inference engine which executes the pose information update step in the map information update method. Pose inference engine 24 infers a pose information update value which is an update value for the item of pose information about the keyframe from the second sum value, and updates the item of pose information about the keyframe using the pose information update value.

Map information update value 10 as described above is capable of achieving the predicted map information calculating method in the map information update method as described above.

[1-4. Inference Engine Learning Method]

The learning method for each of the inference engines described above is described with reference to FIG. 8. As described above, in the present embodiment, the position information update value is inferred by position inference engine 23, the pose information update value is inferred by pose inference engine 24, and the reprojection error information is inferred by error inference engine 20.

Position inference engine 23, pose inference engine 24, and error inference engine 20 are each an engine which has learned, using, as a loss function, the sum of reprojection errors calculated solid geometrically based on the update values for the map information. The update value for the map information is calculated through inference performed by position inference engine 23 and pose inference engine 24 based on the reprojection error information inferred by error inference engine 20 based on the map information.

With the inference engines used in the map information update method according to the present embodiment, it is possible to reduce the degrees of freedom in the inference significantly by inference of the position information and inference of the pose information performed separately by the different inference engines, compared to the degrees of freedom in the case in which update values for the entire map information are inferred collectively. In other words, it is possible to reduce the degrees of freedom corresponding to the difference between (i) the scale determined by the entire Hessian matrix for computing update values for the entire map information, and (ii) the scale of a partial matrix corresponding to the position information in the Hessian matrix and the scale of a partial matrix corresponding to the pose information in the Hessian matrix. Accordingly, it is possible to reduce the man-hours required for learning by each inference engine. Furthermore, the reduction in the degrees of freedom in the inference can increase the reliability of the learning by the inference engine. In this way, it is possible to reduce the model scale (in other words, the amount of computation) required to obtain the necessary inference precision.

In addition, regarding the map information update method according to the present embodiment, generally, when a solution method using the Hessian matrix composed of an optional numerical value combination is performed through inference, the degrees of freedom when achieving the combination between numerical values and solutions thereof are significantly large in a structure such as a simple perceptron or convolutional neural network. As a result, the inference model scale and the amount of computation become large. This increases the scale of learning by each inference model and the amount of computation, resulting in increase in the man-hours for the learning and the degree of difficulty.

On the other hand, in the map information update method according to the present embodiment, the inference model is divided into (i) error inference engine 20 which infers reprojection error information in one projection relationship, and (ii) position inference engine 23 and pose inference engine 24 which infer an update value for position information and an update value for pose information, respectively, from the sum of items of reprojection error information output from error inference engine 20. By dividing the inference model into the inference engines in this way, it is possible to absorb the change in the size of the Hessian matrix using the change between the number of projection relationships (related to the number of times of use of error inference engine 20) and the number of items of position information and the number of items of pose information (related respectively to the number of times of use of position inference engine 23 and the number of times of use of pose inference engine 24). In short, the Hessian matrix scale finally corresponds to the number of times of use of the same inference engine, and it is possible to make each of the divided inference engines to be constant and small. Accordingly, it is possible to simplify the learning by each of the divided inference engines.

[1-5. Experiment Result]

An experiment of updating actual map information has been performed using the map information update method according to the present embodiment. In the experiment, the result of performing bundle adjustment using the map information update method according to the present embodiment and the result of performing bundle adjustment using a conventional map information update method are compared with each other. Here, g2o which is open-to-the-public software using a method for calculating update values solid geometrically without using inference is used as the conventional map information update method.

The result of the experiment shows that the map information update method according to the present embodiment can reduce reprojection errors in output information than reprojection errors in input information, similarly to the conventional map information update method. In addition, the map information update method according to the present embodiment can reduce the amount of computation, and thus can reduce the time required for bundle adjustment to $\frac{1}{10}$ or below. In addition, the map information update method according to the present embodiment can reduce the average value of reprojection errors than the conventional map information update method.

Accordingly, with the map information update method according to the present embodiment, it is possible to perform bundle adjustment precisely in short time compared to the conventional map information update method.

Embodiment 2

A map information update method according to Embodiment 2 is described. The map information update method according to the present embodiment is different from the map information update method according to Embodiment 1 mainly in the reprojection error information obtaining step. Hereinafter, the map information update method according to the present embodiment is described focusing on the differences from the map information update method according to Embodiment 1.

The reprojection error information calculated in the reprojection error information obtaining step in the map information update method according to the present embodiment indicates a reprojection error that is calculated solid geometrically based on (i) one item of position information, (ii) one item of pose information, and (iii) projection coordinate information which correspond to the one of the one or more projection relationships. In short, in the present embodiment, the reprojection error is calculated solid geometrically instead of inferring the reprojection error as in the map information update method according to Embodiment 1.

In this way, in the present embodiment, it is possible to calculate the reprojection error precisely. Furthermore, the position information update value and the pose information update value are calculated through inference also in the present embodiment, and thus in this point, advantageous effects similar to those in the map information update method according to Embodiment 1 are obtained.

Moreover, in the present embodiment, the position information update value is inferred by a position inference engine, the pose information update value is inferred by a pose inference engine, and the reprojection error is calculated solid geometrically. The position inference engine and the pose inference engine are each an engine which has learned, using, as a loss function, the sum of reprojection errors calculated solid geometrically based on the update values for the map information. The update values for the map information can be obtained by inference by the position inference engine and inference by the pose inference engine which are performed based on the reprojection errors calculated solid geometrically based on the map information.

The position inference engine and the pose inference engine according to the present embodiment also provide advantageous effects similar to those provided by position inference engine 23 and pose inference engine 24 according to Embodiment 1.

[Hardware Structure]

Figure 9:
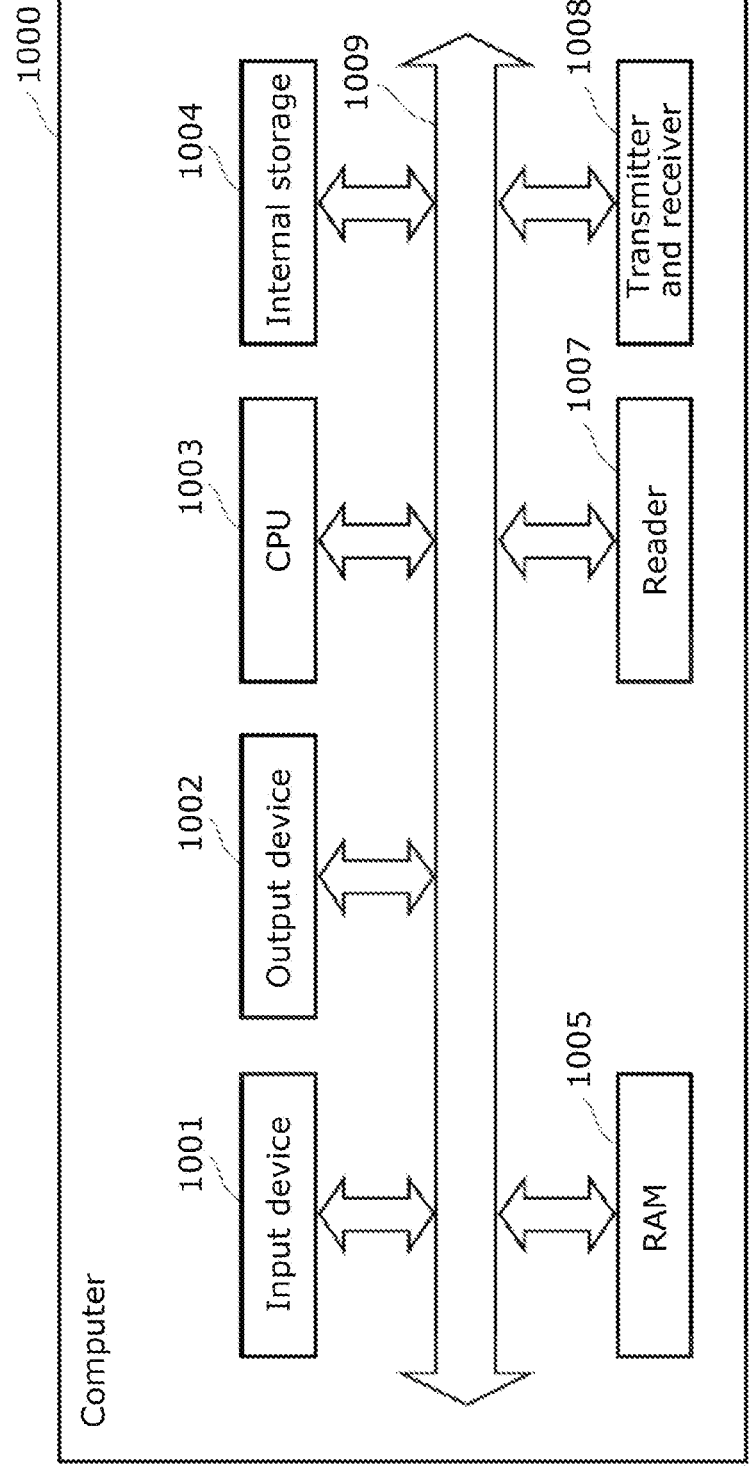
FIG. 9 is a diagram illustrating one example of a hardware structure of a computer for executing, by software, the method according to each of embodiments.

A hardware structure for executing the method according to each of the above-described embodiment is described with reference to FIG. 9. FIG. 9 is a diagram illustrating one example of the hardware structure of computer 1000 for executing, by software, the method according to each of the embodiments. In short, a map information update device which executes the map information update method according to each of Embodiment 1 and Embodiment 2 can be implemented by computer 1000.

As illustrated in FIG. 9, computer 1000 includes input device 1001, output device 1002, CPU 1003, internal storage 1004, RAM 1005, reader 1007, transmitter and receiver 1008, and bus 1009. Input device 1001, output device 1002, CPU 1003, internal storage 1004, RAM 1005, reader 1007, and transmitter and receiver 1008 are connected through bus 1009.

Input device 1001 is a device that functions as a user interface represented by keyboards, a mouse, input buttons, a touch pad, a touch panel display, and the like. It is to be noted that input device 1001 may be configured to receive an operation by voice, a remote operation using a remote controller, or the like, in addition to receiving operations through touch by a user.

Output device 1002 is a device that outputs a signal from computer 1000, and may be a device which functions as a user interface represented by a signal output terminal, and in addition, a display, a speaker, and the like.

Internal storage 1004 is a flash memory or the like. Furthermore, internal storage 1004 may store in advance the program etc., for executing the steps of each of the methods according to Embodiments 1 and 2.

RAM 1005 is a random access memory and is used to store data etc., calculated when executing the program or an application.

Reader 1007 reads information from a storage medium such as a universal serial bus (USB) memory. Reader 1007 reads a program or an application from the storage medium in which the program, the application etc., are stored as described above, so that the program, the application etc., are stored in internal storage 1004.

Transmitter and receiver 1008 is a communication circuit for performing communication wirelessly or by wire. For example, transmitter and receiver 1008 performs communication with a server device connected to a network, and downloads the program, the application etc., as described above from the server device, so that the program, the application etc., are stored in internal storage 1004.

CPU 1003 is a central processing unit. CPU 1003 copies, onto RAM 1005, the program, application, etc., stored in internal storage 1004, sequentially reads instructions included in the copied program, application, etc., from RAM 1005, and sequentially executes the read program, application, etc.

Variations, Etc.

Although the methods according to the present disclosure have been described based on the embodiments, the present disclosure is not limited to these embodiments. Embodiments obtainable by adding various modifications that a person skilled in the art would arrive at to any of the embodiments and other embodiments configurable by combining parts of elements in the embodiments are also included within the scope of the present disclosure.

Furthermore, the embodiments indicated below may be included in the scope of one or more aspects of the present disclosure. Each of the methods according to the present disclosure may be a computer program that is executed by a computer, or may be digital signals of the computer program. Alternatively, the present disclosure may be implemented by a non-transitory computer-readable recording medium that is a CD-ROM, or the like on which the computer program is recorded.

Alternatively, the present disclosure may be implemented as a computer program including a microprocessor and memory. The memory may store the computer program, and the microprocessor may operate according to the computer program.

Alternatively, the program or the digital signals may be transferred via a network by being recorded on the recording medium and being transferred in the recording medium, and may be executed by another independent computer system.

The above embodiments may be combined.

INDUSTRIAL APPLICABILITY

The present disclosure can be used in, for example, VSLAM technology.

The invention claimed is:

1. A map information update method comprising:

obtaining one or more projection relationships;

obtaining, for each of the one or more projection relationships, reprojection error information;

calculating, for each of one or more landmarks, a first sum value based on all items of reprojection error information associated with the landmark;

calculating, for each of one or more keyframes, a second sum value based on all items of reprojection error information associated with the keyframe;

inferring from the first sum value, for each of the one or more landmarks, a position information update value of an item of position information about the landmark, and updating the item of position information about the landmark using the position information update value; and inferring, without repeating computations by an algorithm using a gradient method, from the second sum value, for each of the one or more keyframes, a pose information update value of an item of pose information about the keyframe, and updating the item of pose information about the keyframe using the pose information update value.

2. The map information update method according to claim 1, wherein the inferring the position information update value comprises:

inferring, without repeating computations by the algorithm using the gradient method, from the first sum value, for each of the one or more landmarks, the position information update value of the item of position information about the landmark, and updating the item of position information about the landmark using the position information update value.

3. A map information update method for updating map information including one or more items of position information each associated with a corresponding one or more landmarks and one or more items of pose information each associated with a corresponding one of one or more keyframes, wherein each of the one or more keyframes is a captured image in which an image of at least one of the one or more landmarks is included, each of the one or more items of pose information includes information about a position and information about an orientation, and the map information update method comprises:

obtaining one or more projection relationships each of which is a relationship of (i) a corresponding one of the one or more landmarks, (ii) a corresponding one of the one or more keyframes, and (iii) projection coordinate information corresponding to coordinates of a projection point on the corresponding one of the one or more keyframes at a time when the corresponding one of the one or more landmarks is projected onto the corresponding one of the one or more keyframes;

for each of the one or more projection relationships, (1) obtaining reprojection error information based on (i) an item of position information which is associated with the corresponding one of the one or more landmarks included in the projection relationship among the one or more items of position information, (ii) an item of pose information which is associated with the corresponding one of the one or more keyframes included in the projection relationship among the one or more items of pose information, and (iii) the projection coordinate information included in the projection relationship, and (2) associating the reprojection error information with the projection relationship;

for each of the one or more landmarks, (1) generating a first reprojection error information aggregate in which all items of reprojection error information associated with the landmark are aggregated, and (2) calculating a first sum value based on the all items of reprojection error information included in the first reprojection error information aggregate;

for each of the one or more keyframes, (1) generating a second reprojection error information aggregate in which all items of reprojection error information associated with the keyframe are aggregated, and (2) calculating a second sum value based on the all items of reprojection error information included in the second reprojection error information aggregate;

for each of the one or more landmarks, (1) inferring from the first sum value a position information update value which is an update value of an item of position information about the landmark among the one or more items of position information, and (2) updating the item of position information about the landmark using the position information update value; and for each of the one or more keyframes, (1) inferring from the second sum value a pose information update value which is an update value of an item of pose information about the keyframe among the one or more items of pose information, and (2) updating the item of pose information about the keyframe using the pose information update value.

4. The map information update method according to claim 3, wherein the reprojection error information includes a feature indicating a result of inferring a reprojection error from (i) one of the one or more items of position information, (ii) one of the one or more items of pose information, and (iii) the projection coordinate information which correspond to one of the one or more projection relationships, and the reprojection error is calculated solid geometrically based on the one of the one or more items of position information, the one of the one or more items of pose information, and the projection coordinate information.

5. The map information update method according to claim 3, wherein the reprojection error information indicates a reprojection error that is calculated solid geometrically based on (i) one of the one or more items of position information, (ii) one of the one or more items of pose information, and (iii) the projection coordinate information which correspond to one of the one or more projection relationships.

6. The map information update method according to claim 4, wherein the position information update value is inferred by a position inference engine, the pose information update value is inferred by a pose inference engine, the reprojection error information is inferred by an error inference engine, each of the position inference engine, the pose inference engine, and the error inference engine is an engine that has learned, using, as a loss function, a sum of a plurality of the reprojection errors calculated solid geometrically based on an update value of the map information, and the update value of the map information is calculated by inference by the position inference engine and the pose inference engine performed based on the reprojection error information, the reprojection error information being inferred by the error inference engine based on the map information.

7. The map information update method according to claim 5, wherein the position information update value is inferred by a position inference engine, the position information update value is inferred by a pose inference engine, the reprojection error is calculated solid geometrically, each of the position inference engine and the pose inference engine is an engine that has learned, using, as a loss function, a sum of a plurality of the reprojection errors calculated solid geometrically based on an update value of the map information, and the update value of the map information is calculated by inference by the position inference engine and the pose inference engine performed based on the reprojection error calculated solid geometrically based on the map information.

8. The map information update method according to claim 4, wherein the feature includes a term that is included commonly in blocks including diagonal components in a Hessian matrix that is used to calculate an update value of the map information.

* * * * *